United States Patent
Wolle et al.

(10) Patent No.: US 11,529,984 B2
(45) Date of Patent: Dec. 20, 2022

(54) TRANSPORT DEVICE AND TRANSPORT VEHICLE

(71) Applicant: TANOS GMBH VERPACKEN ORDNEN PRÄSENTIEREN, Illertissen (DE)

(72) Inventors: Lutz Wolle, Burlafingen (DE); Tjeerd Jan Pieter Gerbranda, Leipheim (DE); Tim Traas, Heinkenszand (NL)

(73) Assignee: TANOS GmbH Verpacken Ordnen Präsentieren, Illertissen (DE)

( * ) Notice: Subject to any disclaimer, the term of this patent is extended or adjusted under 35 U.S.C. 154(b) by 48 days.

(21) Appl. No.: 17/059,805

(22) PCT Filed: Jun. 1, 2018

(86) PCT No.: PCT/EP2018/064488
§ 371 (c)(1),
(2) Date: Nov. 30, 2020

(87) PCT Pub. No.: WO2019/228649
PCT Pub. Date: Dec. 5, 2019

(65) Prior Publication Data
US 2021/0229717 A1 Jul. 29, 2021

(51) Int. Cl.
*B62B 1/10* (2006.01)
*A47B 3/08* (2006.01)
(Continued)

(52) U.S. Cl.
CPC ............... *B62B 1/10* (2013.01); *A47B 3/08* (2013.01); *B25H 1/04* (2013.01); *B62B 1/12* (2013.01);
(Continued)

(58) Field of Classification Search
CPC .... B62B 1/10; B62B 1/12; B62B 1/26; B62B 5/06; B62B 2202/12; B62B 2206/06; A47B 3/08; B25H 1/04
See application file for complete search history.

(56) References Cited

U.S. PATENT DOCUMENTS 5,203,815 A * 4/1993 Miller .................... A01K 97/08
280/654
6,386,557 B1 * 5/2002 Weldon .................. B62B 1/264
280/654
(Continued)

FOREIGN PATENT DOCUMENTS

AU 2010101263 12/2010
AU 2010101263 A4 12/2010
(Continued)

OTHER PUBLICATIONS

"Sys-Roll", Systainer, Verpacken Ordnen Prasentieren Transportieren, Tanos GmbH, 2 pages, 2014/2015.

*Primary Examiner* — Bryan A Evans
(74) *Attorney, Agent, or Firm* — Hoffmann & Baron, LLP

(57) ABSTRACT

A transport device including a transport vehicle and a vertical stack of box-shaped containers coupled to each other and attachable to a container attachment interface of the transport vehicle. The container attachment interface is arranged on a bottom part of the transport vehicle. The bottom part has at least one stand foot on its underside on which the transport vehicle stands in an upright position.

18 Claims, 14 Drawing Sheets

(51) Int. Cl.
*B25H 1/04* (2006.01)
*B62B 1/12* (2006.01)
*B62B 1/26* (2006.01)
*B62B 5/06* (2006.01)

(52) U.S. Cl.
CPC ................ *B62B 1/26* (2013.01); *B62B 5/06* (2013.01); *B62B 2202/12* (2013.01); *B62B 2206/06* (2013.01)

(56) References Cited

U.S. PATENT DOCUMENTS

| | | | | |
|---|---|---|---|---|
| 7,367,571 | B1* | 5/2008 | Nichols | B62B 1/12 |
| | | | | 280/47.131 |
| 8,783,710 | B1* | 7/2014 | Kraft | B62B 1/008 |
| | | | | 280/47.33 |
| 2005/0212238 | A1* | 9/2005 | Conley | B62B 1/20 |
| | | | | 280/47.32 |
| 2010/0253025 | A1* | 10/2010 | Smith | B62B 1/12 |
| | | | | 280/47.27 |
| 2016/0257327 | A1* | 9/2016 | Gayk, Jr. | B62B 1/12 |

FOREIGN PATENT DOCUMENTS

| | | | | |
|---|---|---|---|---|
| DE | 10155588 A1 * | 4/2000 | ............... | B62B 1/02 |
| DE | 10155588 | 4/2003 | | |
| DE | 10155588 A1 | 4/2003 | | |
| EP | 2315701 | 5/2011 | | |
| EP | 2315701 A1 | 5/2011 | | |
| WO | 2011/000385 A1 | 1/2011 | | |
| WO | WO 2011/000385 | 1/2011 | | |

* cited by examiner

TRANSPORT DEVICE AND TRANSPORT VEHICLE

This application claims priority based on an International Application filed under the Patent Cooperation Treaty, PCT/EP2018/064488, filed on Jun. 1, 2018.

BACKGROUND OF THE INVENTION

The invention relates to a transport device with a transport vehicle and a vertical stack of box-shaped containers coupled together.

The transport vehicle includes:
- a vehicle body having a bottom part and a vertical frame section extending upwards from the upper side of the bottom part, the bottom part having a storage surface and a container attachment interface for attaching the vertical stack placed on the storage surface with its lowermost box-shaped container to the bottom part,
- a handle arranged on the vehicle body for moving the transport vehicle into a tilted position, and
- two wheels located on the bottom part for supporting the transport vehicle against a floor and moving the transport vehicle relative to the floor in the tilted position.

Such a transport vehicle is known from the state of the art. For example, the product "Sys-Roll" available from the company TANOS GmbH is known as a transport vehicle for the transport of box-shaped containers.

The transport vehicle mentioned at the beginning is typically used to transport one or more box-shaped containers to a job site, for example a construction site. The box-shaped container is usually used to store tools, for example a power tool, and/or tool accessories. In particular, the box-shaped containers are designed in such a way that they can be stacked on top of each other and coupled together in a vertically tension-proof manner to form a stable vertical, in particular cuboid, stack. To this end, the box-shaped containers each have the same horizontal outline and have couplers enabling them to be coupled together. The stack can be placed with the lowest box-shaped container on the storage surface of the transport vehicle and attached by means of the container attachment interface. Expediently, the stack is attached to the transport vehicle with only the lowest container. The vehicle body, especially the vertical frame section, represents a permanently integral structure; i.e. the vehicle body, especially the vertical frame section, remains unchanged in its structure when a box-shaped container is attached and removed. The box-shaped container can be removed from and/or attached to the transport vehicle without the use of tools.

The transport vehicle can be manually moved to a tilted position in which the transport vehicle is tilted with respect to the floor about a tilting axis defined by the wheels. In this position, the transport vehicle can be moved, especially pushed or pulled, in the manner of a sack truck. The transport vehicle can also be referred to as a "sack truck like" or as sack truck.

A combination of the transport vehicle and the goods to be transported with it, for example the box-shaped container mentioned above, shall be referred to as the transport device.

SUMMARY OF THE INVENTION

It is an object of the invention to provide the transport device with an additional function while maintaining its compact and simple design.

The object is solved by a transport device according to claim 1. The bottom part of the transport device has at least one stand foot on its underside, on which the transport vehicle stands in an upright position.

The transport device can therefore be placed in an upright position stable on the floor and remains in this position in which it has been placed. The transport device can thus form an at least temporarily stationary workstation, which can be used to carry out various tasks at the job site.

As explained below, the transport device can be used, for example, to support a worktable in a horizontal working position. The transport device can further have an integrated table on which work can be performed. The tools and/or accessories required for the work are provided, in particular, in the box-shaped containers. The transport device is therefore not only used to transport the box-shaped containers, but can also be used as a temporarily stationary workstation or as part of a temporarily stationary workstation.

Advantageous embodiments are defined in the dependent claims.

BRIEF DESCRIPTION OF THE DRAWINGS

Exemplary details and embodiments are explained below with reference to the figures. Thereby shows.

DETAILED DESCRIPTION

In the following explanations, reference is made to the x-direction, y-direction and z-direction drawn in the figures. The x-direction, y-direction and z-direction are orthogonal to each other. The x-direction can also be referred to as transverse direction, the y-direction as longitudinal direction and the z-direction as vertical direction. Furthermore, the x-direction and the y-direction can also be called horizontal directions. The reference system for the directions is the transport vehicle 2 or the transport device 1 in an upright position.

Figure 1:
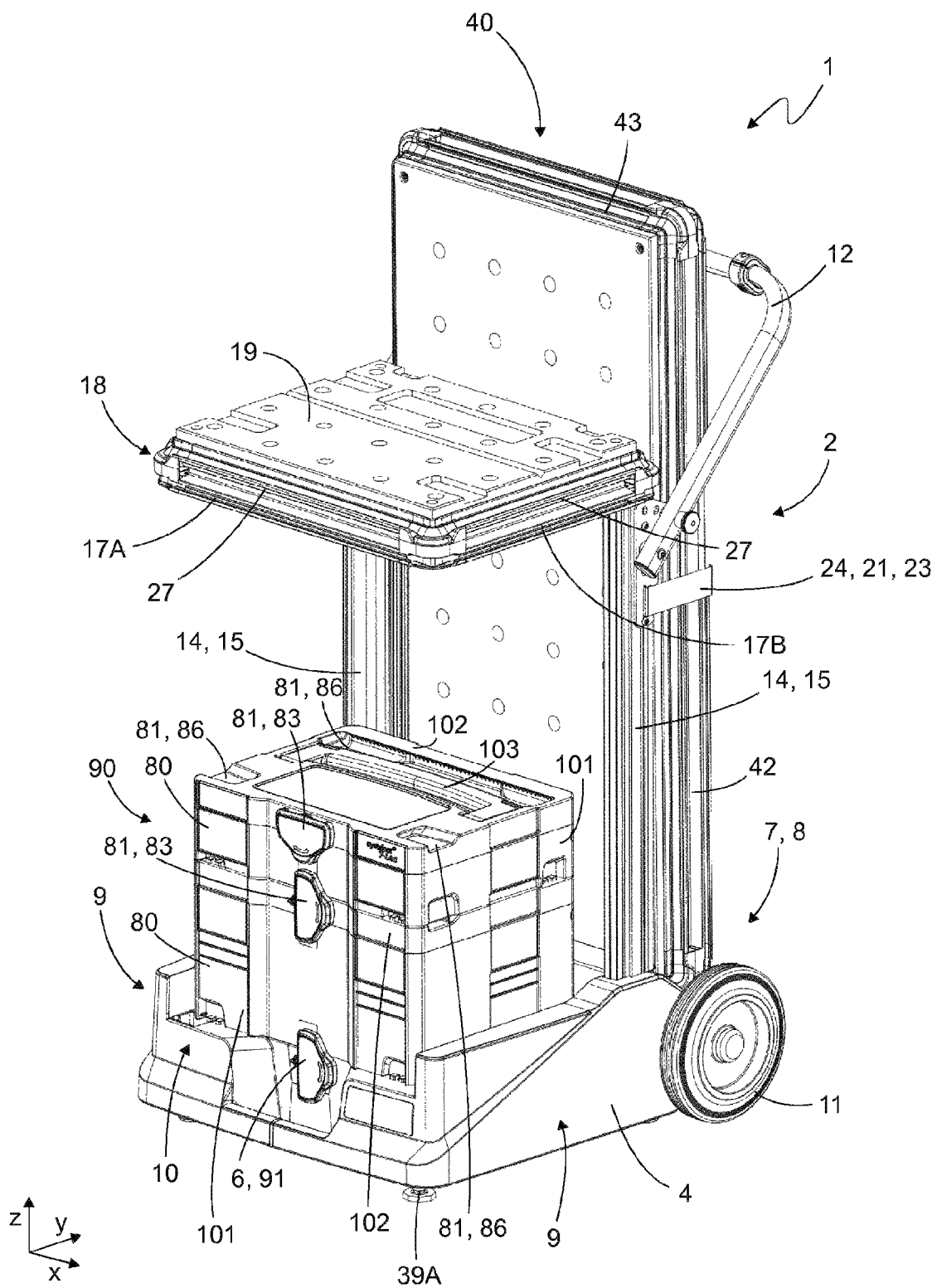
FIG. 1 a transport device,
FIG. 2 a bottom part in a perspective view from above,
FIG. 3 the bottom part in a perspective view from below,
FIG. 4 a transport vehicle in a perspective view from above,
FIG. 5 the transport vehicle in a perspective view from below,
FIG. 6 the transport vehicle with a pull-out arrangement,
FIG. 7 the transport vehicle with an inserted additional container,
FIG. 8 the transport vehicle in a rear view,
FIG. 9 the transport device in a rear view,
FIG. 10 a detailed view of an attachment device,
FIG. 11 the transport device in a perspective view from above,
FIG. 12 the attachment device in a detailed view,
FIG. 13 the attachment device in a sectional view,
FIG. 14 the transport device in a working configuration in a perspective view from above, and
FIG. 15 the transport device in the working configuration in a perspective view from below,
FIG. 16 a box-shaped container,
FIG. 17 a sectional view of a box-shaped container attached to the bottom part, and
FIG. 18 a box-shaped container placed on the bottom part.

FIG. 1 shows a transport device 1 with a transport vehicle 2 and a vertical stack 90 of box-shaped containers 80 coupled together.

The transport vehicle 2 comprises a vehicle body with a bottom part 4 and a vertical frame section 14 extending upwards from the top of the bottom part 4. The bottom part 4 has a storage surface 5 and a container attachment interface 6. By means of the container attachment interface 6, the vertical stack 90 placed on the storage surface 5 is attached to the bottom part 4 with its lowest box-shaped container 80.

The transport vehicle 2 further comprises a handle 12 arranged on the vehicle body, with which handle 12 the transport vehicle 2 can be moved into a tilted position. In addition, the transport vehicle 2 comprises two wheels 11 located on the bottom part 4 with which wheels 11 the transport vehicle 2 can be supported against a floor and moved relative to the floor in the tilted position.

The bottom part 4 has at least one stand foot 39, 39A on its underside, on which stand foot 39 the transport vehicle 2 stands in an upright position.

Further exemplary details are explained below.

Figure 4:
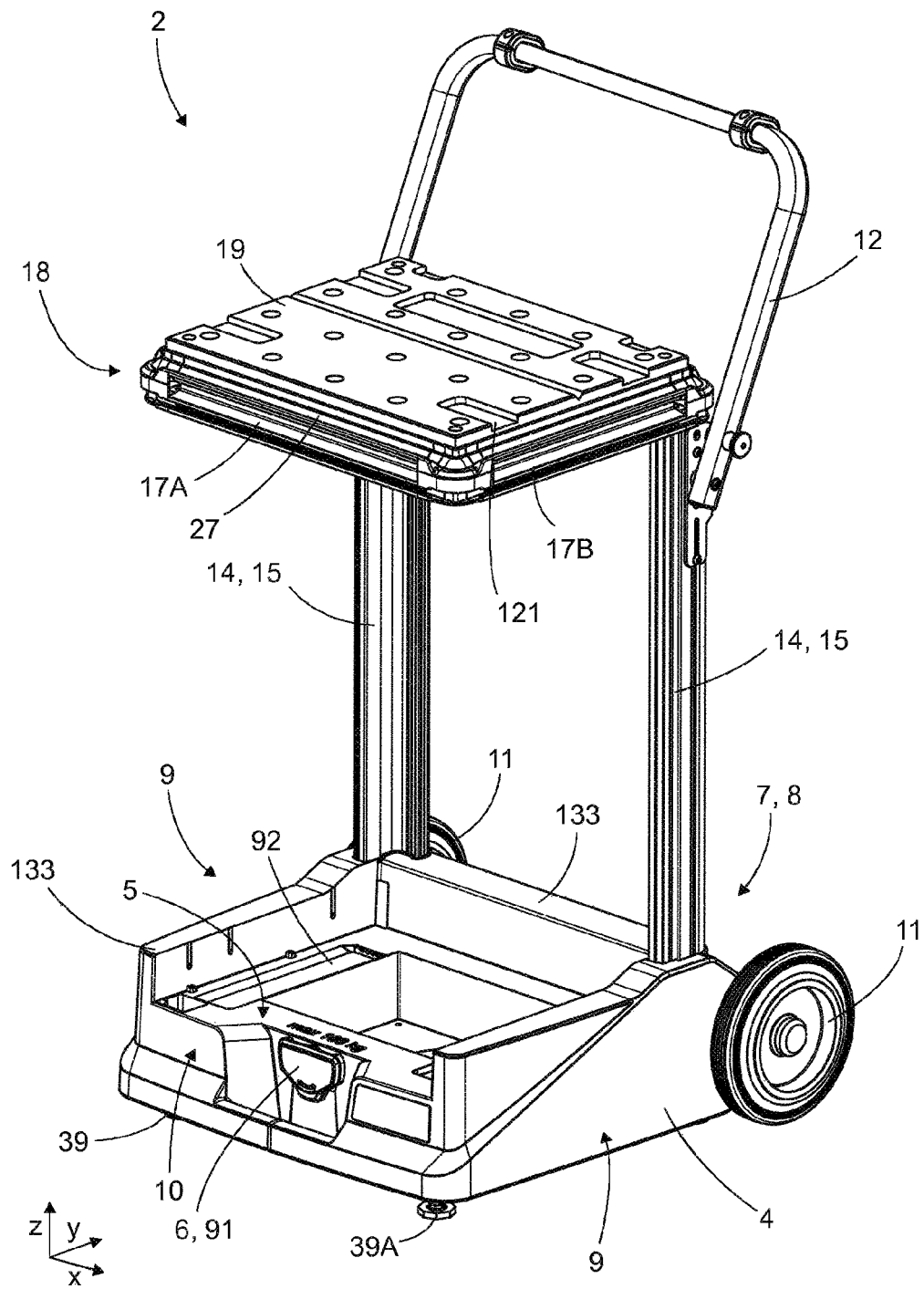
Figure 5:
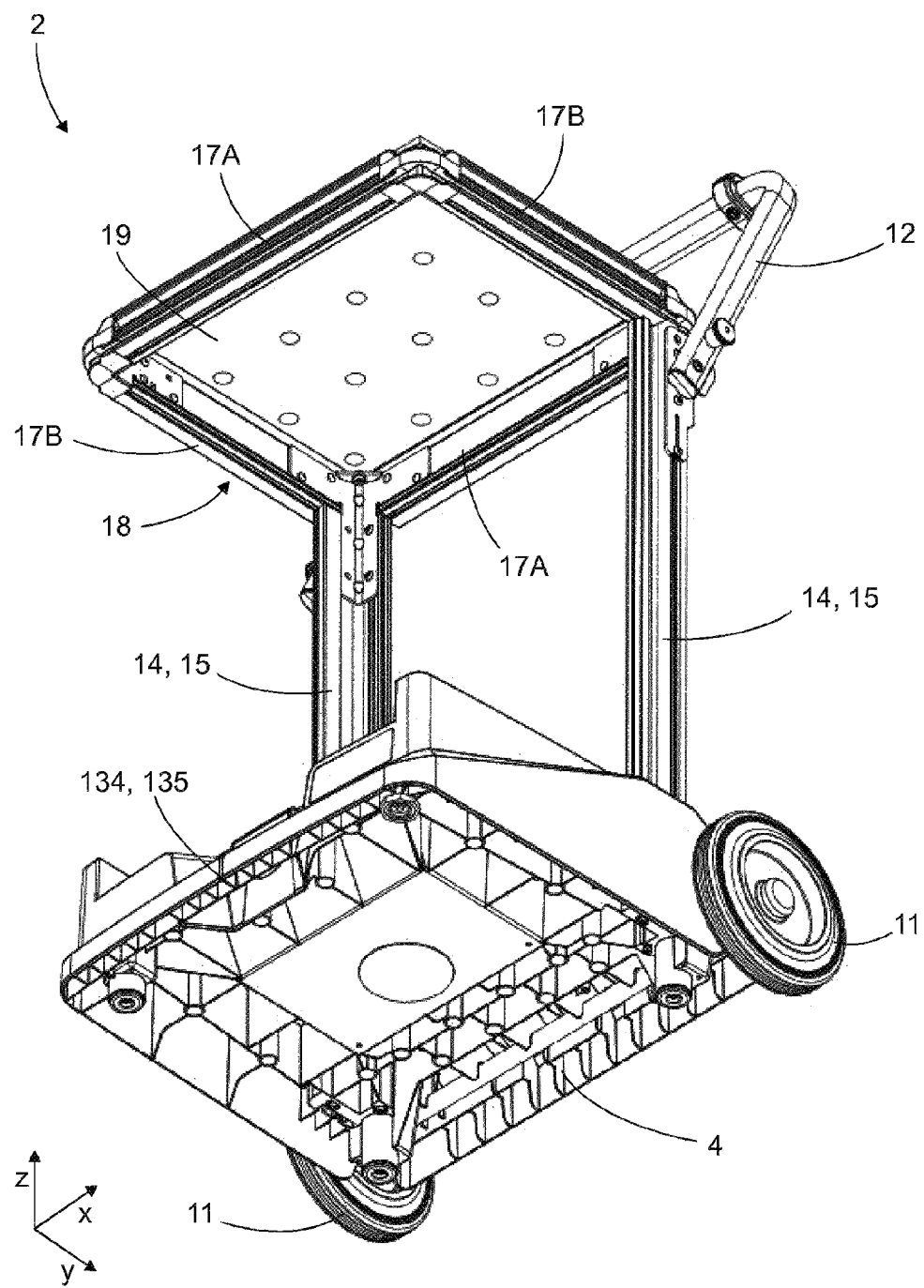

First to the basic construction of the transport vehicle 2:

The transport vehicle 2 is shown on its own—i.e. without the box-shaped containers 80—in FIGS. 4 and 5 and has a transverse front side 10, two longitudinal sides 9 and a transverse rear side 8.

The transport vehicle 2 can assume a standing position, in which it stands stable on the floor. In the standing position, the bottom part 4 is parallel to the floor and the vertical frame section 14 is perpendicular to the floor. The transport vehicle 2 can further assume a driving position in which it is tilted relative to the floor, for example by approximately 45 degrees. In the driving position, the transport vehicle 2 can be set in motion by manual pushing or pulling. The transport vehicle 2 can therefore be handled like a sack truck and can also be described as a sack truck like.

The vehicle body consisting, for example, of the bottom part 4, the vertical frame section 14 and an integrated table 18 has in a y-z side view essentially the shape of a U turned by 90 degrees or the shape of a C. The bottom part 4 and the integrated table 18 each represent horizontal legs in a y-z side view, which are connected by the vertical frame section 14, expediently only by the vertical frame section 14.

The bottom part 4 and the vertical frame section 14 together (without the handle 12) form an essentially L-shaped structure in a y-z side view.

The extension of the vertical frame section 14 in z-direction is greater than the extension of the bottom part 4 in y-direction and greater than the extension of the integrated table 18 in y-direction. The y-extension of the bottom part 4 corresponds to the y-extension of the integrated table 18. The vertical frame section 14 preferably occupies at least 60%, in particular at least 70% of the z-extension of the vehicle body or the transport vehicle 2 without the handle 12.

The vertical frame section 14 is located in the rearward section 7 of the transport vehicle 2. Expediently, the integrated table 18 is only supported in relation to the bottom part 4 by the vertical frame section 14 located in the rearward section 7. Between the integrated table 18 and the bottom part 4 there is therefore a completely free volume in front of the vertical frame section 14 in y-direction, to accommodate one or more box-shaped containers 80. Except for the frame section 14 arranged in the rearward section 7, the volume between the integrated table 18 and the bottom part 4 is preferably completely free.

The vehicle body comprising the bottom part 4, the vertical frame section 14 and the integrated table 18 preferably represents a permanently integral structure that remains unchanged when a box-shaped container 80 is removed and/or attached at the container attachment interface 6. No modification of the vehicle body, in particular of the vertical frame section 14 and/or the integrated table 18, is necessary to remove and/or attach the box-shaped container 80 at the container attachment interface 6. Expediently, the integrated table 18 and/or the vertical frame section 14 cannot be removed from the vehicle body without the use of tools.

Figure 3:
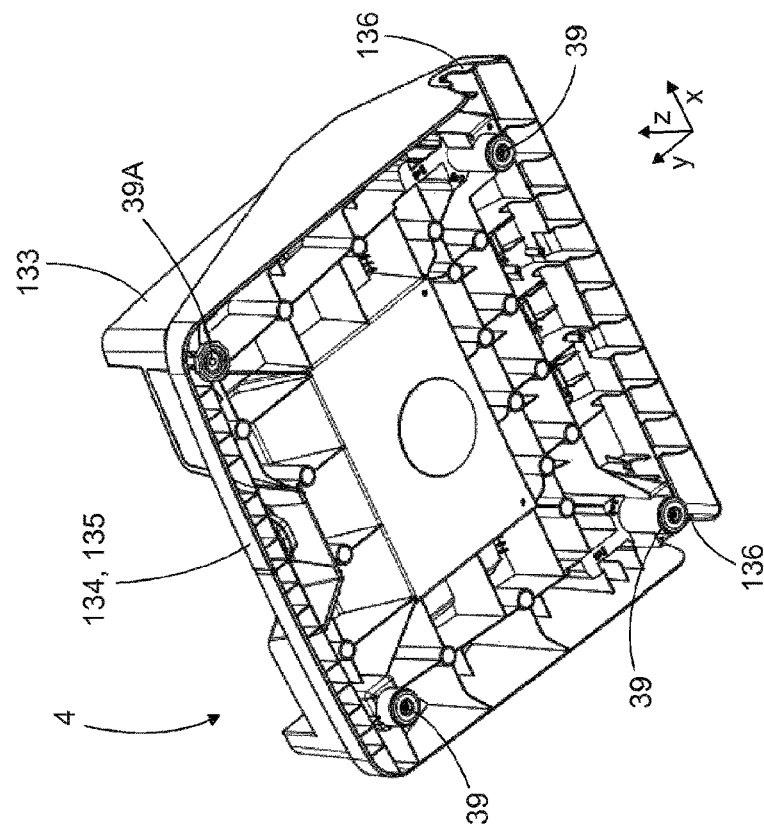
Figure 2:
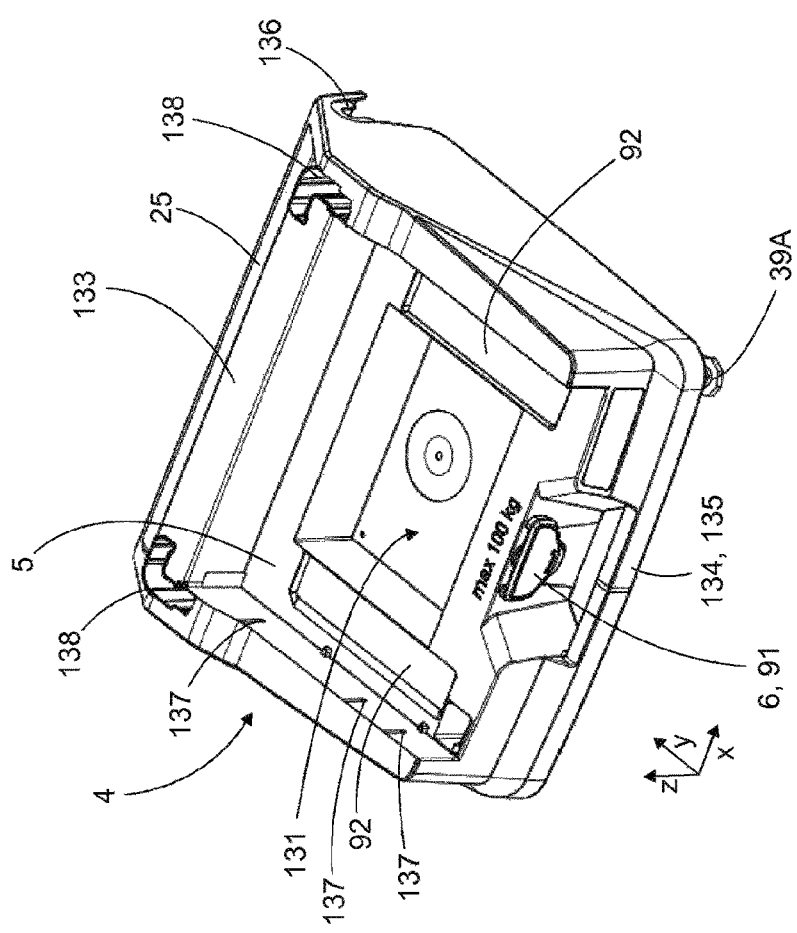

FIGS. 2 and 3 show the bottom part 4, which has an essentially cuboid, especially flat basic shape. The y-extension and the x-extension of the bottom part 4 are each at least twice as large as the z-extension of the bottom part 4.

The bottom part 4 comprises, for example, a preferably one-piece bottom part body manufactured as an injection molded part, which bottom part body provides the storage surface 5. Alternatively, the bottom part 4 or the bottom part body of the bottom part 4 may also be designed as a sheet metal part, in particular as a bent sheet metal part.

The upper side of the bottom part of the body is a continuous, especially relief-like formed surface and is preferably essentially closed. The underside of the bottom part body is, for example, essentially open. Expediently, via the underside of the bottom part body, a plurality of reinforcing ribs are accessible.

The preferably one-piece bottom part body has various integrated structures, in particular the below explained U-shaped elevation 133, recess 131, storage surface 5, handle arrangement 134, non-movable coupling structure 92, wheel mounting sections 136, pull-out attachment interface 137, first attachment device 20, angled top section 25 and/or frame mounting sections 138.

To the preferably one-piece bottom part body, a movable coupling element 91, the stand feet 39, 39A, the vertical frame section 14 and/or the wheels 11 are attached, as explained in detail below.

First to the storage surface 5:

The storage surface 5 is essentially rectangular and preferably as large as the underside of the box-shaped container 80. The storage surface 5 contains, for example, a non-movable coupling structure 92, which is part of the container attachment interface 6 described in more detail below. As an example, the non-movable coupling structure 92 comprises two elongate recesses arranged in the area of the longitudinal sides 9, which elongate recesses extend in y-direction.

Figure 7:
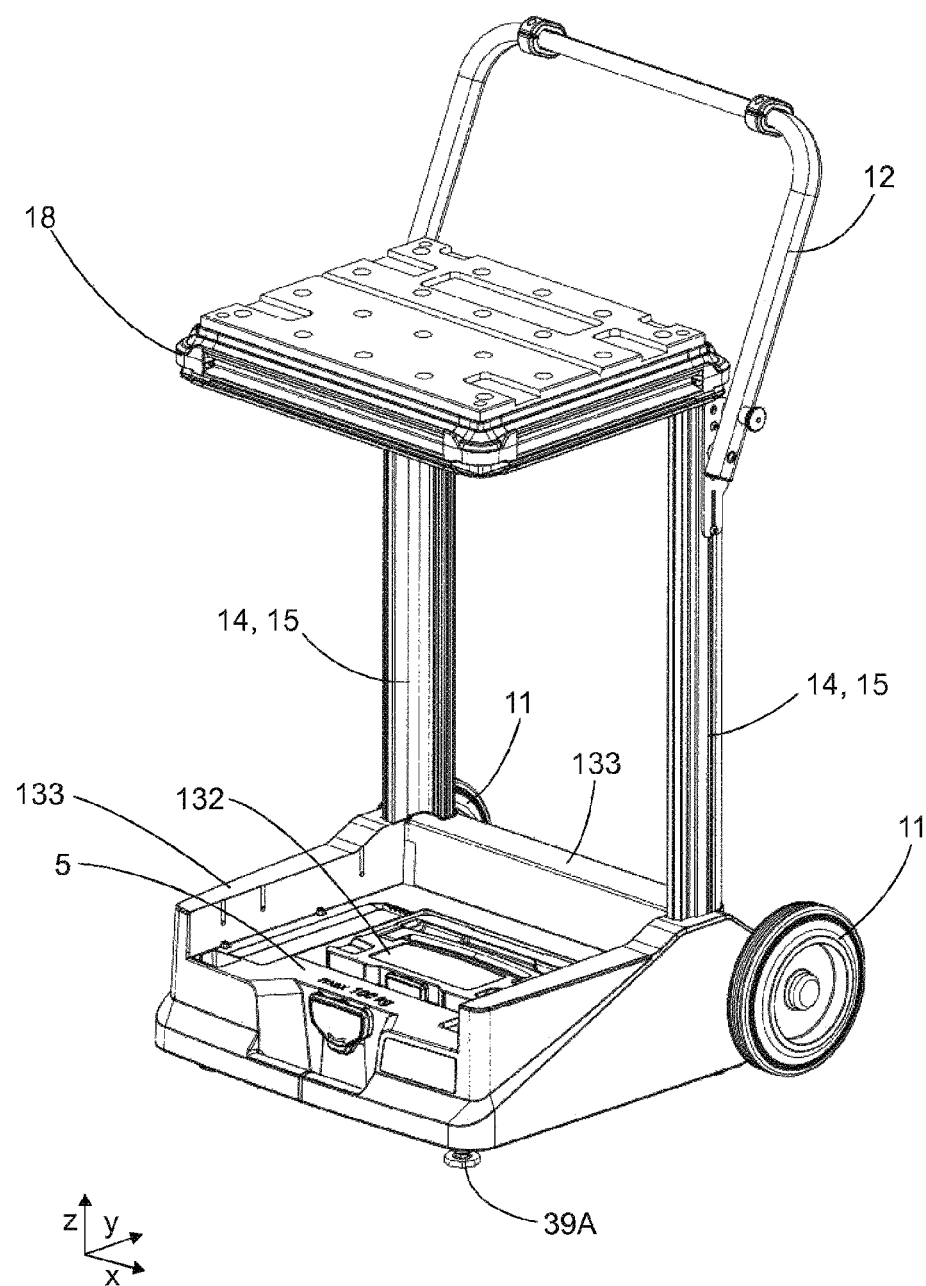

In the storage surface 5, there is a recess 131, for example, which provides a container accommodation volume in which an additional container 132 can be accommodated, which additional container 132 is smaller than the box-shaped container 80. FIG. 7 shows the transport vehicle 2 with an inserted additional container 132. The additional container 132 is especially insertable in a loose manner. When the additional container 132 is inserted, the box-shaped container 80 can be placed on the storage surface 5 and attached to the bottom part 4 via the container attachment interface 6. The box-shaped container 80 then covers the additional container 132.

As an example, the additional container 132 is a scaled down version of the box-shaped container 80, so that the description of the box-shaped container 80 below also applies to the additional container 132. The additional container may, for example, contain accessories, especially tool accessories. The recession 131 is cuboid, for example. Since the recess 131 is located in the storage surface 5, an essentially frame-shaped storage surface 5 results.

The storage surface 5 is surrounded by the U-shaped elevation 133. The U-shaped elevation 133 is open towards the front. The legs of the U-shaped elevation 133 represent upper sections of the longitudinal sides 9 of the bottom part 4. As an example, the vertical frame section 14 extends upwards from the U-shaped elevation 133.

The bottom part 4 has frame mounting sections 138, to which vertical frame elements 15 of the vertical frame section 14 are mounted. The frame mounting sections 138 include for example openings, which are preferably arranged at the two corner points of the U-shaped elevation 133. The openings are L-shaped, for example. The vertical frame elements 15 are inserted into the openings.

The bottom part 4 is equipped with four stand feet 39, 39A on its underside. These stand feet are used to keep the transport vehicle 2 stable on a flat floor in standing position. The stand feet 39, 39A are not wheels. The stand feet 39 have a cylindrical shape, for example, and are aligned with their cylinder axis or longitudinal axis parallel to the z-direction. The stand foot 39A is preferably height-adjustable and the other three stand feet 39 are not height-adjustable. In particular, the stand foot 39A has a screw section with which the stand foot 39A is attached to a thread on the bottom part body so that the height of the stand foot 39A can be changed by a screw movement. The stand feet 39, 39A are expediently located in the four corner areas of the underside of the bottom part 4.

The transport vehicle 2 is designed to support itself against the floor in the upright position with the stand feet 39, 39A and especially not with the wheels 11. For this purpose the stand feet 39, 39A extend vertically further down than the wheels 11, i.e. the stand feet 39, 39A represent the lowest point of the transport vehicle 2 in the upright position of the transport vehicle 2. In the tilted position, the transport vehicle 2 stands on the wheels 11; in the tilted position, the transport vehicle 2 does not stand on any of the stand feet 39, 39A.

The bottom part 4 has a handle arrangement 134 at its front 10 with a fully embraceable carrying handle 135. The handle arrangement 134 is expediently designed as the lower edge of the bottom part 4, in particular of the one-piece bottom part body, the lower edge projecting in the y-direction. Expediently, the handle arrangement 134 extends over more than half, more than 70 percent or over the entire x-extension of the front 10 of the bottom part 4.

The handle arrangement 134 is designed on the underside as a grippable structure extending in the y-direction, which exemplarily comprises two spaced apart walls running parallel to each other in the x-direction, which are expediently connected to each other by a plurality of ribs. In the y-direction behind the handle arrangement 134, one or more free spaces are expediently provided in the bottom part 4, in which the fingers of a user can be accommodated when gripping the handle arrangement 134.

The completely embraceable carrying handle 135 is present only in the middle x-range of the bottom part 4, for example, and is expediently formed by a bar-shaped section that bridges an indentation on the front side. Between the carrying handle 135 and the front of the indentation there is an opening through which a user can put his fingers when embracing the carrying handle 135.

The bottom part 4 has a wheel mounting section 136 on each of its two longitudinal sides 9, with one of the wheels 11 mounted on each wheel mounting section 136. The wheel mounting sections 136 are expediently designed as downwardly open recesses in the longitudinal sides 9 of the bottom part and are preferably arranged in the rearward section 7. Accordingly, one wheel 11 is arranged on each of the longitudinal sides 9 of the bottom part 4, namely in the rearward section 7 of the transport vehicle 2, i.e. near the rear side 8. The two wheels 11 have coaxially arranged axes of rotation aligned in the x-direction.

In the following, the container attachment interface 6 provided at the bottom part 4 will be discussed in more detail. For example, the container attachment interface comprises a movable coupling element 91 which can be moved into a locked or released position by user actuation. In the locked position, the coupling element 91 engages with a first non-movable coupling structure arranged on the box-shaped container 80. In the released position, the coupling element 91 releases the first non-movable coupling structure so that the box-shaped container 80 can be removed from the bottom part 4.

The movable coupling element 91 is exemplarily designed as a rotating bolt, especially as a T-shaped rotating bolt. Preferably, the movable coupling element 91 is a body which is movably attached to the bottom part 4, but is itself rigid. The movable coupling element 91 can be manually moved into different rotary positions in order to selectively establish or release the attachment of the container 80 to the transport vehicle 2.

The movable coupling element 91 is arranged at the front 10 of the bottom part 4 and is preferably rotatably mounted, especially around a y-axis of rotation. The movable coupling element 91 is located in the indentation on the front 10.

The container attachment interface 6 preferably further includes the non-movable coupling structure 92 mentioned above. The non-movable coupling structure 92 can be engaged with lower container couplers 82 explained below.

Figure 17:
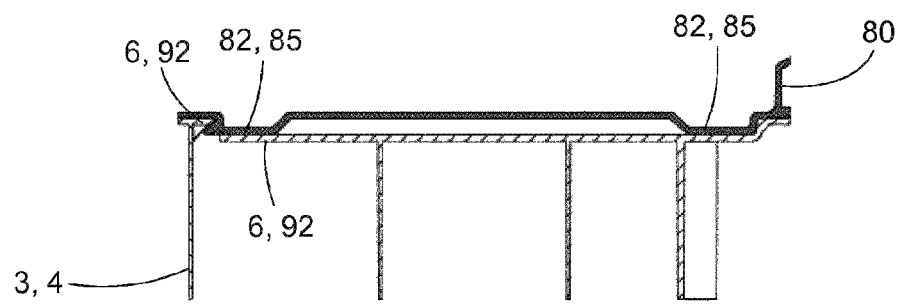

FIG. 17 shows a vertical section through the box-shaped container 80 in a state in which its second non-movable coupling structure 85, designed as feet, engages with the non-movable coupling structure 92 of the container interface 6. As an example, the non-movable coupling structure 92 has a projection which is engaged behind by the feet, in particular the rear feet, expediently only by the rear feet.

Preferably, the container attachment interface 6 and/or the container 80 is designed in such a way that, in a state fixed to the transport vehicle 2, the container 80 is attached to the transport vehicle 2 with its bottom and front side, in particular only with its bottom and front side, to the transport vehicle 2.

In the following, the first attachment device 20 on the bottom part will be discussed. The first attachment device 20 is shown in FIGS. 8 to 13.

The first attachment device 20 is part of a worktable attachment interface 24 that allows an elongate worktable 40 to be attached in vertical orientation to the transport vehicle 2. The first attachment device 20 comprises a slot 20 and an attachment structure 29 accessible through the slot 20, which attachment structure can be engaged with an attachment element 41 of the worktable 40 to attach the worktable 40 to the worktable attachment interface 24. The first attachment device 20 is located in rearward direction behind the vertical frame section 14.

The attachment arrangement 48 and the slot 22 are preferably designed in such a way that the attachment arrangement 48 can only be inserted into the slot 22 in the above-mentioned tilted position of the worktable 40.

Figure 9:
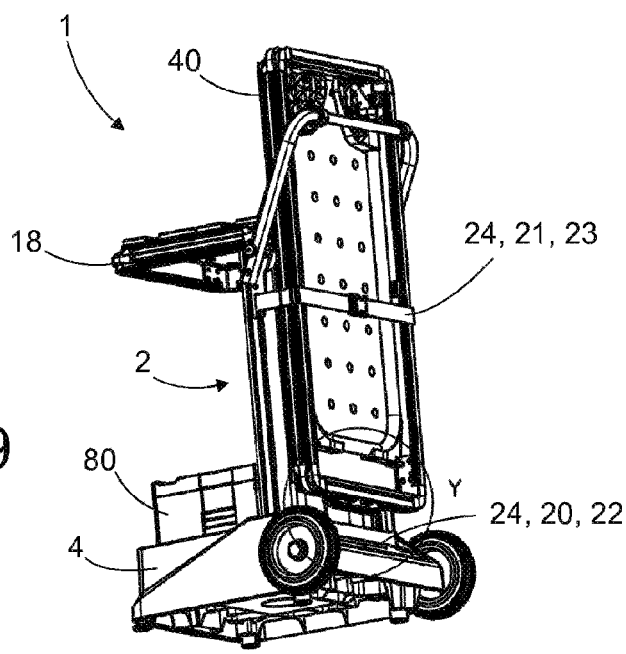
Figure 10:
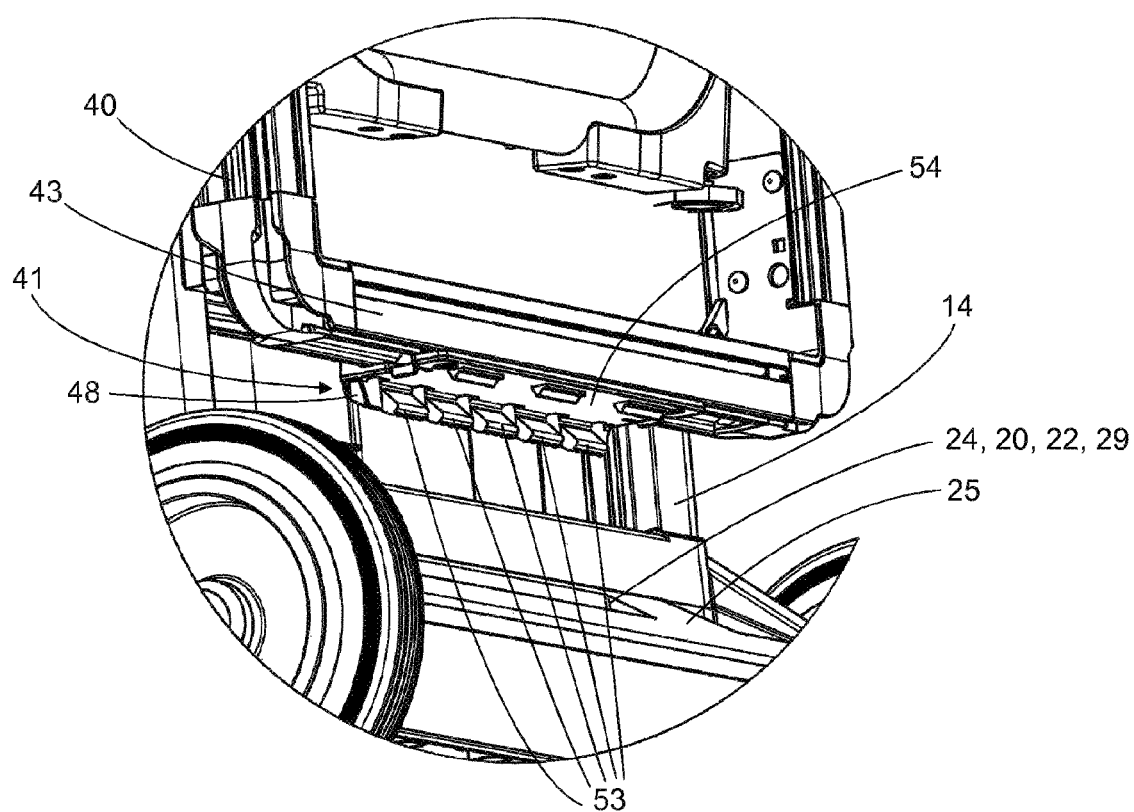

FIG. 10 shows the area marked "Y" in FIG. 9 in detail. For better visibility, the worktable 40 is shown in FIGS. 9 and 10 in a position where the attachment element 41 is not inserted into slot 22. If the worktable 40 is correctly attached to the transport vehicle 2, the attachment element 41 is inserted into the slot 22.

As shown in FIG. 10, the slot 22 extends in the x-direction and is located in the y-direction immediately behind the vertical frame section 14. The slot 22 is located on an angled top section 25. The normal vector of the angled top section 25 points especially in a y-z direction. FIG. 10 further shows the attachment element 41, which has an especially hook-shaped attachment arrangement 48 with several L-shaped attachment projections 53, for example. The attachment structure 29 is designed in such a way that it can be engaged with the attachment arrangement 48, in particular the attachment projections 53, so that the worktable 40 is fixed to the bottom part 4 at least in one linear direction, in particular the vertical direction.

Figure 11:
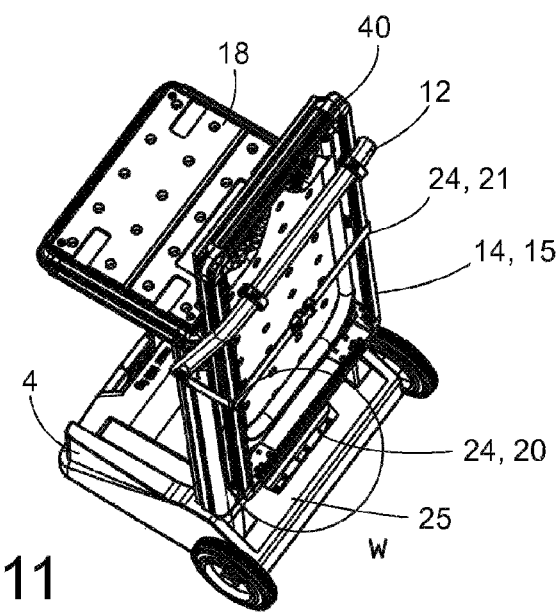
Figure 12:
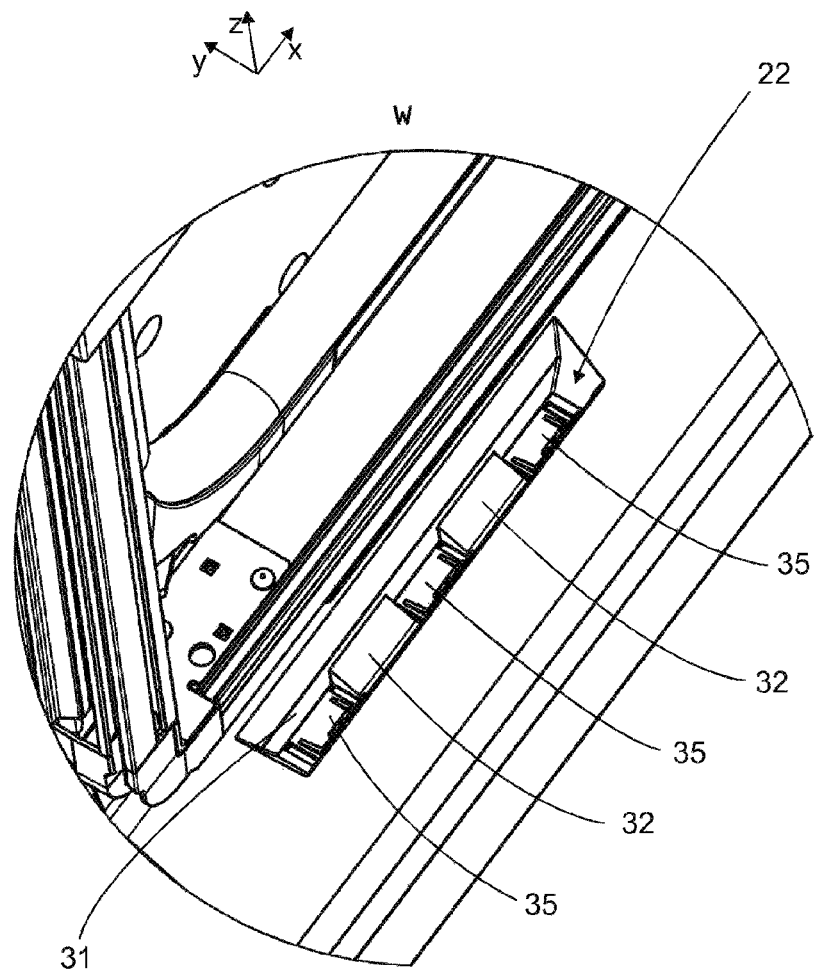

FIG. 12 shows the area marked "W" in FIG. 11 in detail.

FIG. 12 shows in particular the slot 22. Via the slot 22, the attachment structure 29 is accessible. The slot 22 contains two angled reinforcing structures 32, which are spaced apart in the x-direction. Between the reinforcing structures 32 and in x-direction in front of and behind the reinforcing structures 32 there are catch hooks 35. The reinforcing structures 32 and the catch hooks 35 are arranged in correspondence with the attachment projections 53, so that when the attachment element 41 is inserted into the slot 22, several attachment projections, in particular the first, third and fifth attachment projection, are located in the area of the catch hooks 35.

Figure 13:
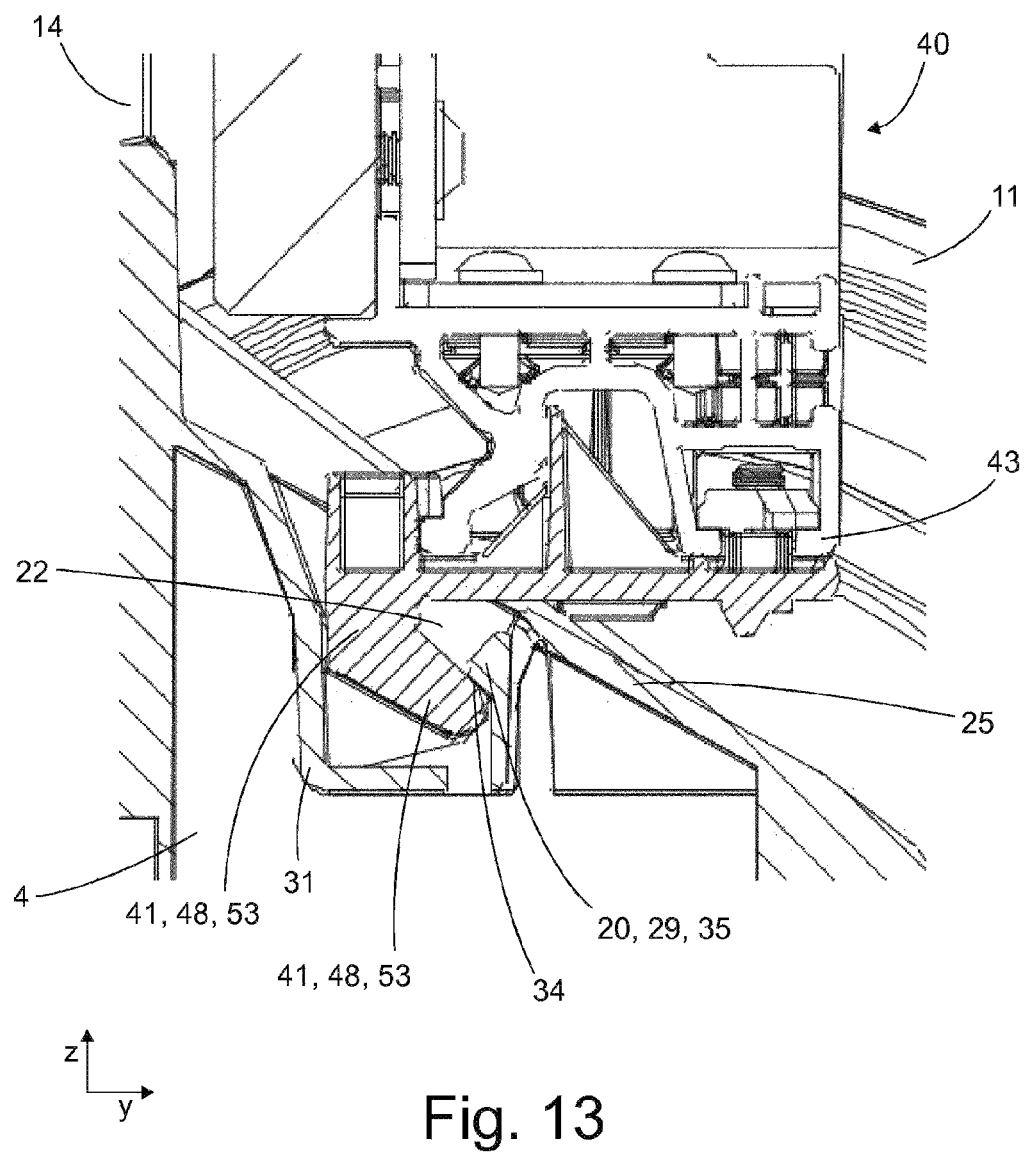

FIG. 13 shows a sectional view of the first attachment device 20 with inserted attachment element 41. The attachment structure 29 comprises an attachment surface 34 which is gripped by the attachment arrangement 48. The attachment surface 34 is provided by a horizontal projection. The horizontal projection can be part of an L-shaped catch hook 35, which is spring-loaded to the rear wall of the attachment structure 29. Preferably, several L-shaped catch hooks are arranged next to each other in the x-direction, so that a respective L-shaped catch hook can be engaged with an attachment projection 53. Preferably, no L-shaped catch hook is provided for every second attachment projection 53, in particular for the second and fourth attachment projection 53, and, preferably, a reinforcing structure 32 is provided instead.

Figure 6:
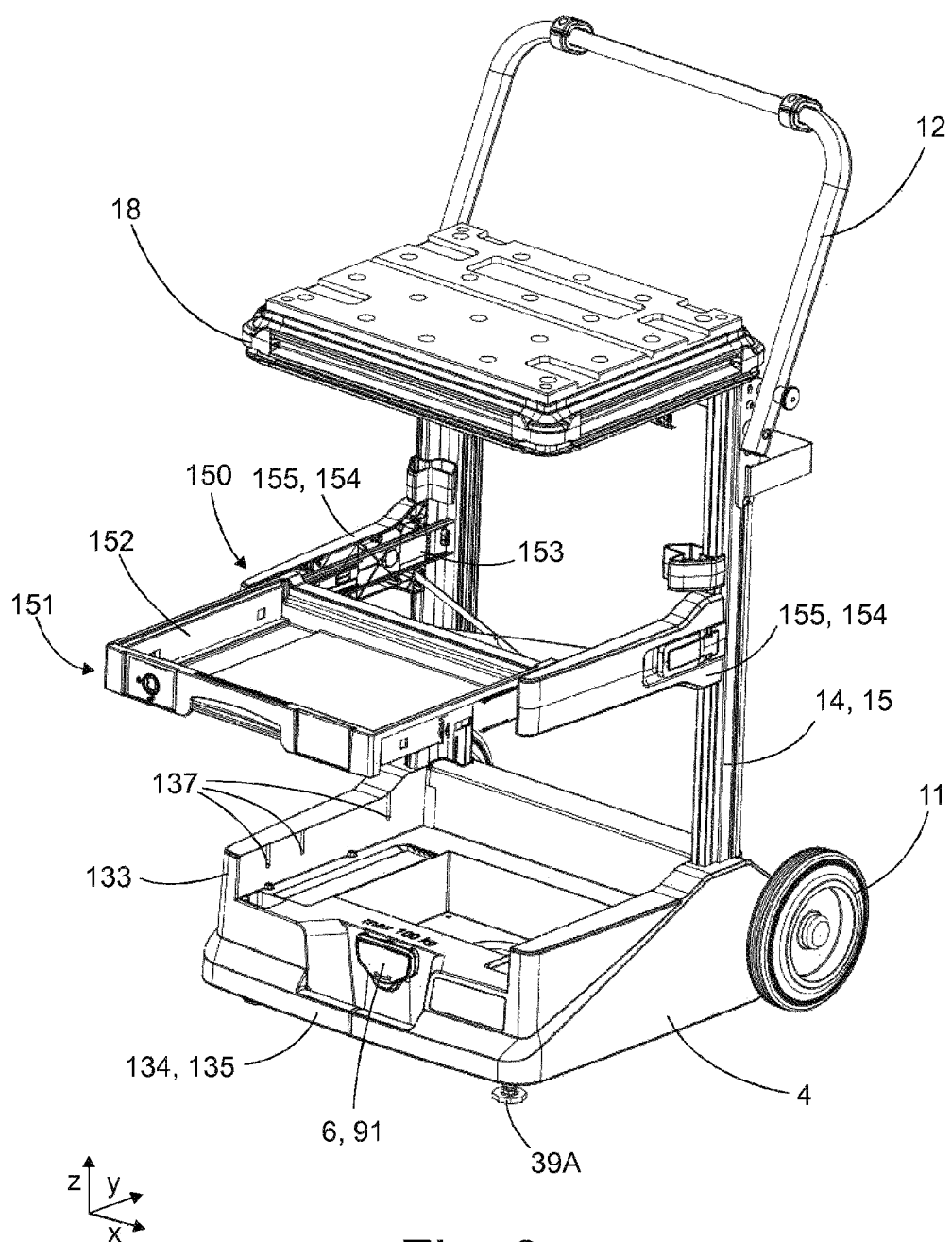

FIG. 6 shows the transport vehicle 2 with a pull-out assembly 150. The pull-out assembly 150 is located above the container attachment interface 6 and expediently below the integrated table 18 on the vertical frame section 14. The pull-out assembly 150 comprises a pull-out unit 151 with a pull-out container accommodation element 152 for the in particular loose accommodation of a box-shaped container 80. The container accommodation element 152 is designed as a tray, drawer or push tray.

The pull-out unit 151 further includes a pull-out mechanism 153, in particular a telescopic pull-out mechanism. The pull-out unit 151 is attached by means of a detachable connection, in particular a screw connection, to a support assembly 155, which is part of the pull-out assembly 150, and which is expediently equipped with two support arms 154.

The bottom part 4 preferably has a pull-out attachment interface 137 to which the pull-out unit 151 (in a state removed from the support assembly 155) can be attached, in particular via the pull-out mechanism 153. The pull-out unit 151 can expediently be provided without the support assembly 155 and can be attached directly to the pull-out attachment interface 137, so that the pull-out container accommodation element 152 is provided directly at the bottom part 4.

In this condition, the storage surface 5 is expediently covered by the pull-out unit 151 and cannot be used to place the box-shaped container 80.

The pull-out attachment interface 137 is arranged on the inner sides of the legs of the U-shaped elevation 133, for example. The U-shaped elevation 133 is designed in such a way that the pull-out unit 151 fits into the space provided between the legs of the U-shaped elevation 133. Expediently, the pull-out attachment interface 137 includes at least one, in particular three holes on each inner side, with which the pull-out unit 151 can be attached to the bottom part 4 via screw connections.

In the following, the vertical frame section 14 and the integrated table 18 will be discussed:

The vertical frame section 14 spans an x-z-plane. As an example, the vertical frame section 14 comprises two elongate, parallel vertical frame elements 15 extending vertically upwards from the bottom part 4. Preferably, the vertical frame section 14 consists of the two frame elements 15.

The two vertical frame elements 15 each occupy the same y and z range and are offset from each other in the x direction. The vertical frame elements 15 are arranged in the y-direction near the rear side 8, i.e. in the rearward section 7, and are located in the x-direction in the area of the longitudinal sides 9. The two vertical frame elements 15 are attached to the upper side of the bottom part 4 and extend vertically upwards.

The vertical frame elements 15 are exemplarily designed as profiles, especially as metal profiles.

The table 18 integrated in the vehicle body follows the vertical frame section 14 in the z-direction. The integrated table 18 represents the vertical upper end of the vehicle body—i.e. in particular the transport vehicle 2 without the handle 12. The integrated table 18 represents the vertically highest point of the vehicle 2 without the handle 12. The integrated table 18 is optional. Instead of the integrated table 18, for example, there could also be a stiffening element between the two vertical frame elements 15.

The integrated table 18 has four longitudinal, horizontal frame elements 17A, 17B. The horizontal frame elements 17A, 17B are exemplarily designed as profiles, especially as metal profiles. The frame elements 17 together form a horizontal frame section in the form of a rectangular frame on which the table top 19 of the integrated table 18 is arranged, in particular placed. The integrated table 18 occupies essentially the same x-y area as the bottom part 4. The integrated table 18 has a cuboid, especially flat basic shape.

The horizontal frame section defines an x-y plane orthogonal to the x-z plane defined by the vertical frame section 14. The horizontal frame section is attached to the upper end of the vertical frame section 14, for example to the upper end of the two vertical frame elements 15. The integrated table 18 is attached in particular with its two rear corner sections to the vertical frame elements 15.

Preferably, the integrated table 18 has a support section 27, on which the worktable 40, which is explained in more detail below, can be supported in a horizontal orientation with the attachment element 41 mounted to the front of the worktable 40 in order to assume a stable working position.

The support section 27 is shown in FIG. 1 and is present on one, several or all horizontal frame elements 17A, 17B. The support section 27 includes a groove, especially a V-groove, in which the attachment element 41 can engage. The groove is preferably open at the top so that the attachment element 41 can engage in the groove from above. Expediently, the groove extends over the entire length of the horizontal frame element 17A, 17B.

The box-shaped container 80 and the container attachment interface 6 are explained in more detail below, with particular reference to FIG. 1. FIG. 1 shows the transport vehicle 2 with at least one attached box-shaped container 80 and an attached worktable 40. This arrangement of the transport vehicle 2, container 80 and worktable 40 shall also be referred to as transport device 1.

The container attachment interface 6 is used to attach the box-shaped container 80 to the lower section 3, especially the bottom part 4, of the transport vehicle 2, preferably in such a way that the box-shaped container 80 is fixed in all spatial directions. Expediently, the container attachment interface 6 is designed in such a way that the container 80 can be attached to and/or detached from the container attachment interface 6 without the use of tools.

As an example, in FIG. 1, a vertical stack 90, comprising two box-shaped containers 80 stacked and coupled together, is placed on the storage surface 5 and is attached to the bottom part 4 by the container attachment interface 6.

Now to the container 80:

The container 80 has a cuboid basic shape. As an example, the container 80 has a bottom part 101 and a lid 102 which is placed on the bottom part 101. Expediently, the lid 102 is hinged to the bottom part 101. Preferably, the bottom part 101 and the lid 102 have the same horizontal outer contour. On the upper side of the container 80, a carrying handle 103 is provided as an example, which can be folded out in particular. The carrying handle 103 is purely optional and can also be omitted.

Figure 16:
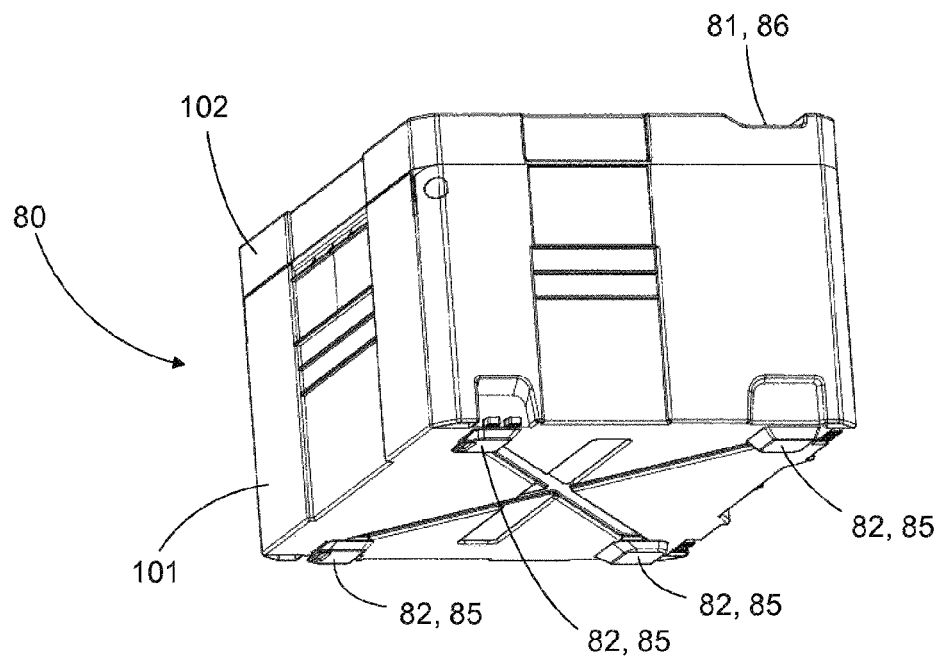
Figure 18:
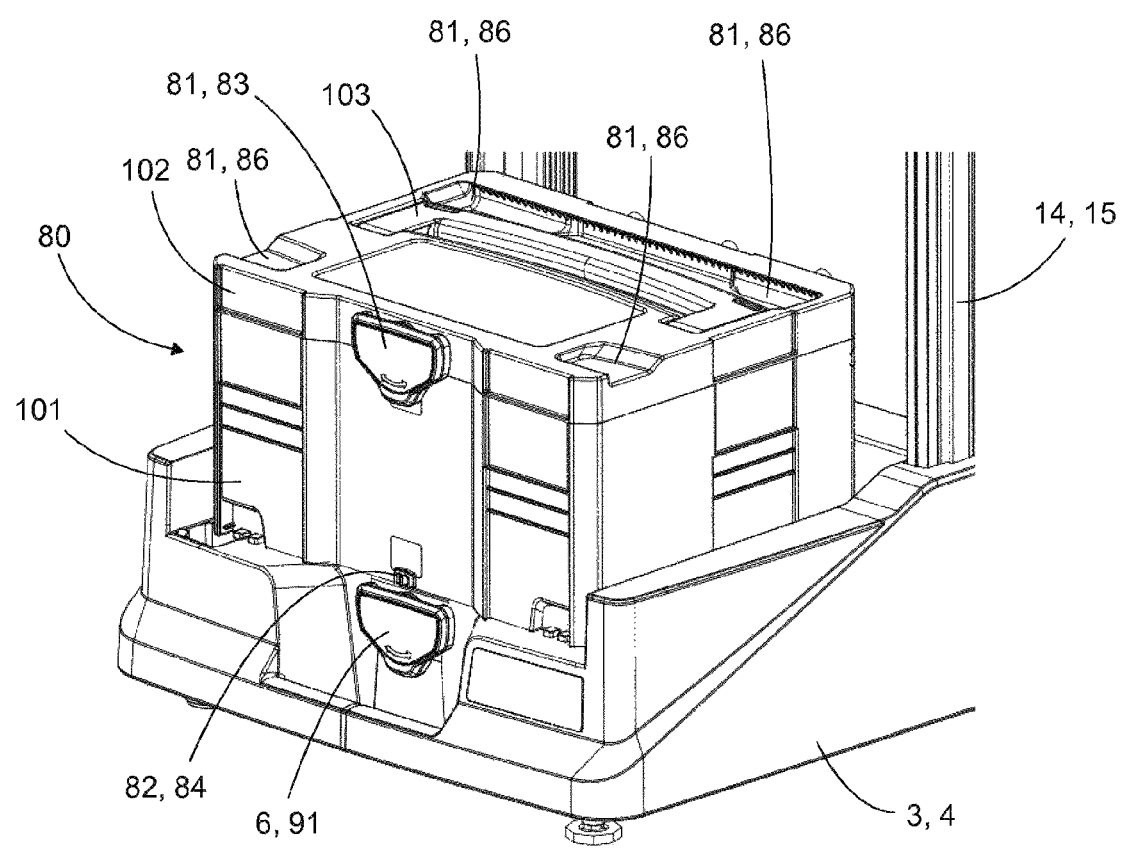

The container 80 has upper container couplers 81 and lower container couplers 82, which can be seen especially in FIGS. 16, 17 and 18. As an example, the upper container couplers 81 are designed to correspond to the lower container couplers 82, so that a further container 80 equipped with identical container couplers can be placed on the present container 80 and the lower container couplers 82 can be used to attach the further container 80 to the upper container couplers 81 of the present container 80, in particular in such a way that the two containers 80 are fixed in all spatial directions with respect to each other and form a stable vertical stack 90.

The lower container couplers 82 comprise in particular a first non-movable coupling structure 84, for example a coupling projection, which can be engaged with the movable coupling element 91. The non-movable coupling structure 84 is located in particular at the front of the container 80.

The lower container couplers further include a second non-movable coupling structure 85, such as feet, which can engage with the non-movable coupling structure 92 and are located on the underside of the container 80.

The upper container couplers 81 expediently comprise a movable coupling element 83, exemplarily a rotary bolt, in particular a T-shaped rotary bolt, which is expediently designed in correspondence to the movable coupling element 91. The movable coupling element 83 can be engaged in particular with the first non-movable coupling structure 84 of another container 80. Furthermore, the movable coupling element 83 can be used to lock the lid 102.

The upper container couplers 81 further preferably include a third non-movable coupling structure 86, which may expediently be engaged with the second non-movable coupling structure 85 of a further container 80. The third non-movable coupling structure 86 preferably comprises one or more recesses and is located at the top of the container 80.

The container 80 is designed in particular in such a way that in a state fixed to a further container 80, the (present) container 80 is fixed to the further container 80 with its bottom and front side, in particular only with its bottom and front side.

The containers 80 described above may, for example, be designed in accordance with the containers described in EP2315701B1.

In the following, the possible configurations of the transport device 1 will be discussed.

Figure 14:
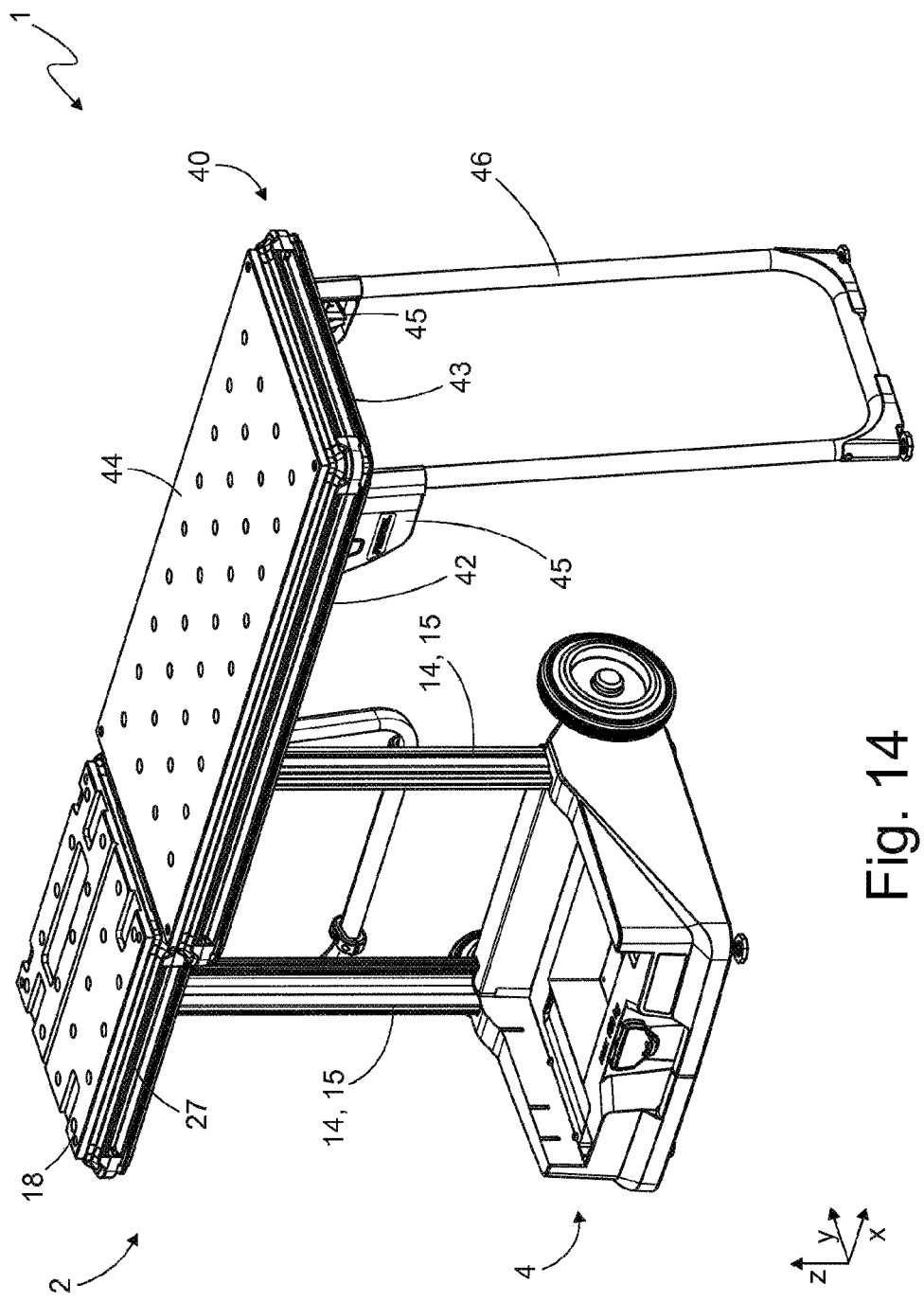
Figure 15:
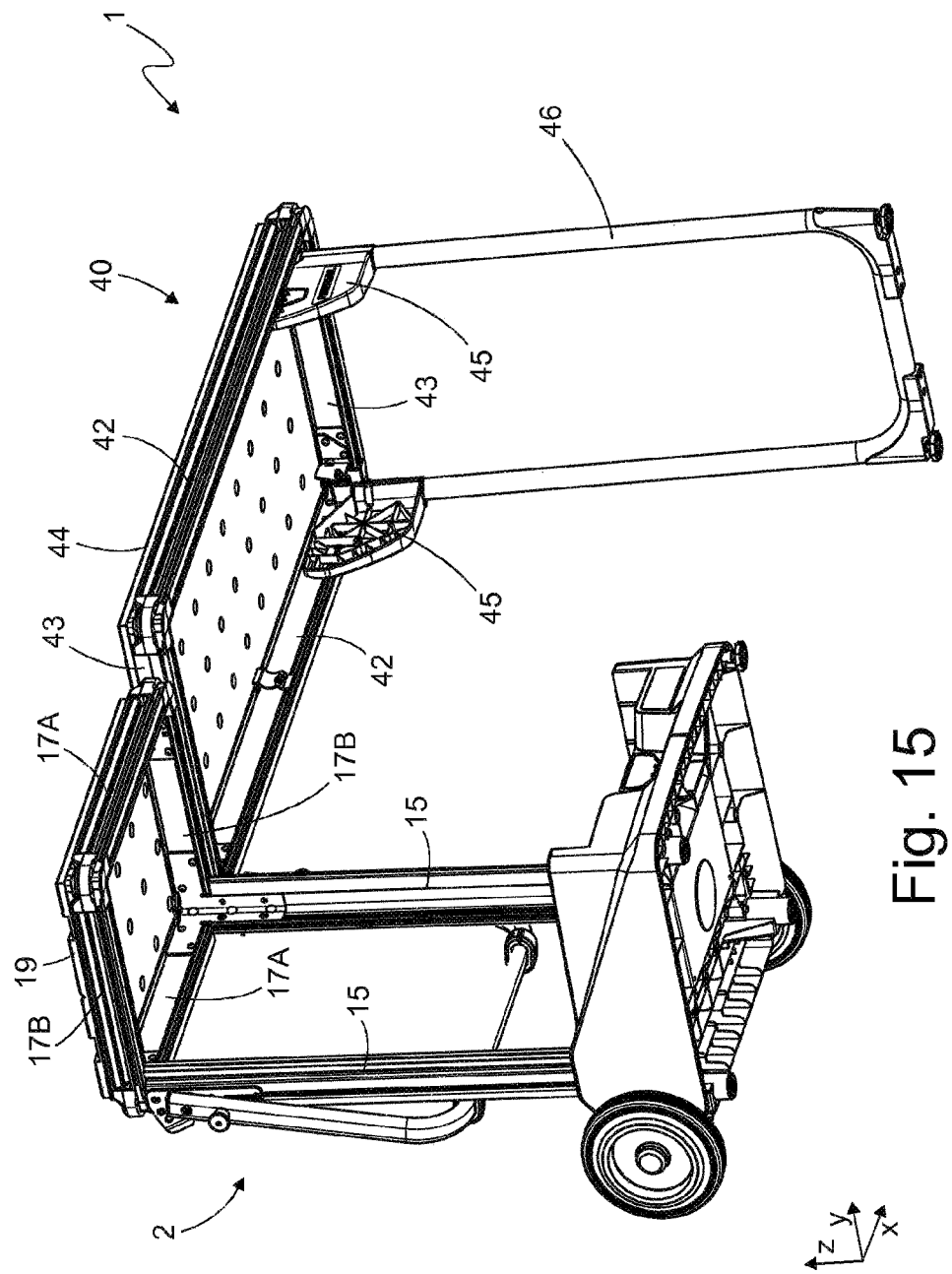

The transport device 1 equipped with the elongate worktable 40 can expediently assume at least two different configurations: a transport configuration in which the worktable 40 is attached in vertical orientation to the transport vehicle 2 as shown in FIG. 1 and a working configuration in which the worktable is attached in horizontal orientation to the integrated table 18 as shown in FIGS. 14 and 15.

In the transport configuration, the worktable 40 (and in particular also the box-shaped container 80) is fixedly attached to the transport vehicle 2, so that the worktable 40 (and the box-shaped container 80) are fixedly attached to the transport vehicle 2 and can be transported by the transport vehicle 2 even in a driving position in which the transport device 1 is tilted with respect to the floor 30.

Expediently, the elongate worktable 40 can be completely removed from the transport vehicle, in particular without the use of tools.

The elongate worktable 40 can be attached to the transport vehicle 2 without the use of tools in a vertical orientation in the rearward section 7 by means of the worktable attachment interface 24 in order to assume a transport position in which the elongate worktable 40 can be transported by the transport vehicle 2.

As shown in FIG. 1, in the transport position the worktable 40 is aligned with its longitudinal axis vertically—i.e. in z-direction. In the transport position, the table plane of the worktable 40 is aligned parallel to an x-z plane. The x-extension of the worktable 40 corresponds to the x-extension of the vertical frame section 14. In the transport position, the worktable 40 rests against the vertical frame section 14 and occupies the same x-area as the vertical frame section 40. In the z-direction, the worktable 40 extends in the transport position from the bottom part 4 upwards and preferably projects above the transport vehicle 2, in particular the integrated table 18 and/or the handle 12.

In the transport position, the worktable 40 is arranged behind the vertical frame section 14 in the rearward direction—i.e. in the y-direction towards the rear side 8. In the y-direction, in the transport position, the worktable 40 is located on the side of the vertical frame section 14 facing the rear side 8. The storage surface 5 is located on the other side as an example—i.e. on the side of the vertical frame section 14 facing the front side 10.

FIGS. 14 and 15 show the transport device 1 in a working configuration. In the working configuration, the worktable 40 is removed from the worktable attachment interface 24. Furthermore, the worktable 40 is in a horizontal orientation; i.e., its table plane is parallel to an x-y plane. The position of the worktable 40 shown in FIGS. 14 and 15 can also be referred to as the stationary working position. In the working position, the worktable 40 is supported at one of its front sides by the transport vehicle 2, in particular by the integrated table 18. On the front side facing away from the transport vehicle 2, the worktable 40 is supported by a table leg arrangement 46 which is explained in more detail below.

In the working configuration, the attachment element 41 engages in the groove of the support section 27 with its attachment arrangement 48, in particular with the attachment projections 53. In the working configuration, the worktable 40 can be removed from the transport vehicle 2 without tools.

Expediently, a corresponding support section 27, on which the worktable 40 can be supported, is provided on the front 10, the two longitudinal sides 9 and/or the rear 8 of the transport vehicle 2, in particular the integrated table 18. The worktable 40 can therefore be selectively attached to the front side 10, a first longitudinal side 9, a second longitudinal side 9 and/or the rear side 8.

Next, the worktable attachment interface 24 will be discussed in more detail.

The worktable attachment interface 24 is used to attach the worktable 40 to the transport vehicle 2 in such a way that the worktable 40 can be stably transported by transport vehicle 2. Preferably, the worktable attachment interface 24 is designed in such a way that when attached the worktable 40 is fixed in all spatial directions relative to the transport vehicle 2.

Figure 8:
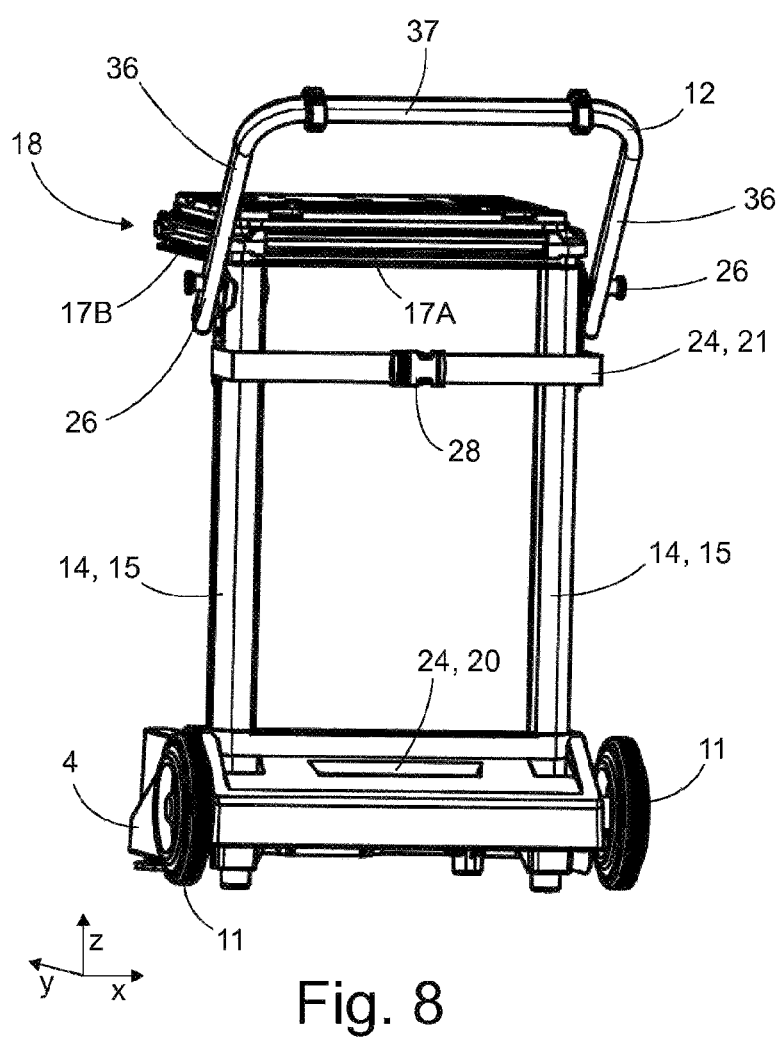

The worktable attachment interface 24 includes the first attachment device 20 and a second attachment device 21. The two attachment devices 20, 21 are shown in FIG. 8, for example The first attachment device 20 is designed in such a way that the worktable 40 with the attachment element 41 can be mounted to the first attachment device 20 in a tilted orientation relative to the vertical frame section 14 and a vertical fixing to the first attachment device 20 is achieved by pivoting the worktable 40 towards the vertical frame section 14. With the second attachment device 21, the worktable 40 can then be fixed horizontally, in particular to the vertical frame section 14.

To remove the worktable 40, it is necessary to release the second attachment device 21 and to pivot the worktable 40 away from the frame section 14 so that it is tilted relative to the vertical frame section 14. The worktable 40 can then be removed from the transport vehicle 2 by a linear movement in y-z direction.

In the following, an exemplary design of the second attachment device 21 will be discussed in detail:

The second attachment device 21 is arranged on the vertical frame section 14, exemplarily in the upper area of the vertical frame section 14. The second attachment device 21 comprises a belt 23, with which the worktable can be fixed in horizontal direction to the vertical frame section 14 in the transport position. The belt 23 is attached at two anchorage points as an example. The two anchorage points are at the same height. For example, the belt 23 is laid crosswise around the worktable 40 in the transport position. In this position, the belt 23 has a U-shaped course in an x-y view. The belt 23 has a locking element 28 with which it can be opened to release or receive the worktable 40 and closed to secure the worktable 40. As an example, the locking element 28 is arranged in the x-direction in the center of the belt 23.

In the following, the handle 12 will be explained in more detail:

The handle 12 is expediently bow-shaped, especially U-shaped. The handle 12 has two outer sections 36, with which the handle is pivotally mounted to the vertical frame section 14. The two outer sections 36 are connected by a central section 37 running in the x-direction.

The transport vehicle 2 is equipped with a positioning mechanism 26 with which the handle 12 can be positioned and fixed in at least two different pivot positions. For example, handle 12 can be fixed in three different pivot positions by the positioning mechanism.

In the following, the worktable 40 shall be discussed in more detail, with particular reference to FIGS. 14 and 15.

The worktable 40 has an elongate, especially rectangular basic shape. Expediently, the worktable 40 is at least 1.5 times, especially twice as long as it is wide. The worktable 40 has a frame-shaped worktable frame, which includes longitudinal worktable frame elements 42 and transverse worktable frame elements 43. The longitudinal worktable frame elements 42 and the transverse worktable frame elements 43 are expediently bar-shaped and designed in particular as profiles, preferably as metal profiles. A table top 44 is mounted on the frame-shaped worktable frame.

The worktable 40 has the fold-out table leg arrangement 46, which is exemplary U-shaped. The (when folded out) vertical sections of the table leg arrangement 46 shall also be referred to as table legs. The table leg arrangement 46 is expediently located at the underside of the worktable 40, preferably in the area of one front side of the worktable 40.

The invention claimed is:

1. A transport device comprising a transport vehicle and a vertical stack of box-shaped containers coupled together, wherein the transport vehicle comprises:
   a vehicle body with a bottom part and a vertical frame section extending upwards from the upper side of the bottom part, wherein the bottom part has a storage surface and a container attachment interface for attaching, with its lowermost box-shaped container, the vertical stack placed on the storage surface to the bottom part;
   a handle arranged on the vehicle body for moving the transport vehicle into a tilted position; and
   two wheels arranged on the bottom part for supporting the transport vehicle in the tilted position relative to a floor and moving the transport vehicle relative to the floor,
   wherein the bottom part has on its underside at least one stand foot on which the transport vehicle stands in an upright position, and
   wherein the bottom part comprises, in a rearward section, a first attachment device of a worktable attachment interface for attaching an elongate worktable in vertical orientation to the transport vehicle, and
   wherein the first attachment device comprises a slot and an attachment structure accessible via the slot.

2. The transport device according to claim 1, wherein at least one box-shaped container has a carrying handle on its upper side.

3. The transport device according to claim 2, wherein the bottom part has a plurality of stand feet on its underside and the transport vehicle is adapted to be supported against the floor in the upright position with the stand feet.

4. The transport device according to claim 2, wherein at least one stand foot is adjustable in height.

5. The transport device according to claim 2, wherein the bottom part comprises a bottom part body manufactured as an injection-molded part which provides the storage surface.

6. The transport device according to claim 2, wherein the container attachment interface comprises a movable coupling element, which can be moved by user actuation selectively into a locking position or a release position, wherein the coupling element in the locking position engages a first non-movable coupling structure disposed on the lowermost box-shaped container so that the lowermost box-shaped container is secured to the bottom part, and in the release position releases the first non-movable coupling structure so that the lowermost box-shaped container is removable from the bottom part.

7. The transport device according to claim 2, wherein there is a recess in the storage surface, the recess providing a container accommodation volume in which an additional container smaller than the box-shaped container can be accommodated.

8. The transport device according to claim 2, wherein the bottom part has a U-shaped elevation which surrounds the storage surface and from which the vertical frame section extends upwards.

9. The transport device according to claim 2, wherein the bottom part has a handle arrangement on its front side with a completely embraceable carrying handle.

10. The transport device according to claim 2, wherein the bottom part has a wheel mounting section on each of its two longitudinal sides, one of the wheels being mounted on each wheel mounting section.

11. The transport device according to claim 2, wherein the transport vehicle comprises above the container attachment interface a pull-out assembly with a pull-out unit arranged on the vertical frame section, the pull-out unit having a pull-out container accommodation element for accommodating a box-shaped container.

12. The transport device according to claim 2, wherein the transport device further comprises a pull-out unit with a pull-out container accommodation element for accommodating a box-shaped container, wherein a pull-out attachment interface to which the pull-out unit can be attached is further provided on the bottom part.

13. The transport device according to claim 2, further comprising an elongate worktable which can be supported in a horizontal orientation by a support section provided on the transport vehicle to assume a stationary working position.

14. The transport device according to claim 1, wherein the bottom part comprises a bottom part body and the at least one stand foot protrudes from an underside of the bottom part body vertically downwards.

15. The transport device according to claim 14, wherein the wheels extend vertically further downwards than the underside of the bottom part body and the stand foot extends vertically further downwards than the wheels.

16. The transport device according to claim 1, wherein the at least one stand foot comprises one height-adjustable stand foot and plural non-height-adjustable stand feet.

17. The transport device according to claim 1, wherein the bottom part comprises a one-piece bottom part body comprising the slot.

18. The transport device according to claim 17, wherein the bottom-part comprises an angled top section on which the slot is located.

\* \* \* \* \*